United States Patent Office 3,095,397
Patented June 25, 1963

3,095,397
STABLE POLYBUTADIENE LATEX PAINT CONTAINING ZINC OXIDE AND HAVING ENHANCED FREEZE STABILITY AND WASH RESISTANCE
John H. Musch, Silver Lake, Ohio, assignor to The Firestone Tire & Rubber Company, Akron, Ohio, a corporation of Ohio
No Drawing. Filed Oct. 3, 1957, Ser. No. 687,877
4 Claims. (Cl. 260—29.7)

This invention relates to water dispersion paints and, more particularly, to a water dispersion paint of enhanced washability and freeze stability.

In the past several years, the commercial importance of latex emulsion paints has developed to the extent that these coatings are now competitive with the conventional solvent-type paints, particularly for use on interior surfaces. In addition to the appeal to the public of a "rubber paint," the latex emulsion paints possess a number of outstanding characteristics which account for their wide commercial acceptance. Even an amateur may successfully apply these paints by brush or roller, since the dried paint film is essentially free from "brush marks," both after initial application and touch-up. Since drying is accomplished primarily by the loss of water by evaporation, the latex paints are relatively free from odor. Further, these paints do not create the fire hazard which has attended the use of conventional paints containing volatile solvents, driers, and the like.

As might be expected, however, the development of suitable latices and the compounding and use of water dispersion paints have been accompanied by a number of serious problems. Failure to resolve some of these problems has prevented the full utilization of these otherwise excellent coatings.

One of the most vexing problems which has been encountered by the producers of water dispersion paints is that of freeze stability. Obviously, for a paint to enjoy wide commercial successs, it must be amenable to shipment to various sections of the country without concern for normal temperature changes. Similarly, it must be possible to store the paint product in ordinary storage facilities without making provision for maintaining storage temperatures above the freezing level.

The latices employed in water base paints range from hard and brittle to tacky, depending upon the monomer or monomers used in the production of the latex. Even those latex particles which are relatively hard and nontacky possess strong cohesive characteristics. When the usual water base latex paint is frozen, the emulsion is broken and when the paint is thawed, the latex particles coagulate into strongly cohesive clusters which are difficult or impossible to redisperse. Thus, many of the otherwise excellent latex paints now commercially available become worthless if the paint is inadvertently frozen during transportation or storage.

A further very serious problem which has been encountered in the use of water dispersion paints is that of washability. The term "washability" is used by the paint industry to describe the ability of a paint to resist deterioration when rubbed, scrubbed or washed with water or an aqueous solution of a surface-active agent. Good wash characteristics are found in latex emulsion paints which dry to tough, hard, continuous, water- and alkaliresistant films. Obviously, a water-sensitive paint will not, in general, possess good wash characteristics.

Because of their desirable characteristics and relative economy, butadiene and styrene are the monomeric materials most commonly employed in the preparation of latex for water emulsion paints. Although some attempts have been made to employ homopolymers of styrene or butadiene, the satisfactory commercially available latex paints almost universally employ a styrene-butadiene copolymer latex. Despite the relative cheapness of butadiene, it has been found necessary by the art to employ a major proportion of styrene in such copolymers in order to obtain the desired toughness and hardness in the paint film.

Styrene homopolymers have been found too brittle, while butadiene homopolymers have generally been found to be too soft and tacky for use in latex type coatings. Aside from producing a dried film of insufficient toughness, latices of polybutadiene homopolymers have generally been characterized by insufficient mechanical and chemical stability for satisfactory use in latex paints. Specifically, polybutadiene latex has been subject to undesirable viscosity increase during storage, and has had insufficient stability to permit loading with pigments to the degree requisite to a satisfactory commercial composition. Particular difficulty has been encountered in attempting to compound polybutadiene latex with pigment systems containing uncoated zinc oxide, since this excellent and inexpensive pigment has been found to cause excessive gelation of the paint mixture during storage. Moreover, polybutadiene latex, as heretofore produced, has not exhibited the necessary freeze stability for commercial use in latex paints.

Previously developed water emulsion paints comprising polybutadiene latex have, in the past, been undesirably water-sensitive and have shown little resistance to washing or scuffing. These paints have proved extremely sensitive to water and have sloughed off surfaces to which they have been applied when subjected to even mild rubbing with an aqueous detergent material. For these reasons, the art has been unable successfully to employ homopolymers of butadiene or of other conjugated diolefins in commercially acceptable water dispersion paints.

In view of these and other difficulties encountered by the art, a primary object of this invention is an improved latex emulsion paint containing a homopolymer of a conjugated diolefin.

A further object of the invention is a latex emulsion paint containing the homopolymer of a conjugated diolefin which is characterized by improved freeze stability and washability.

A particular object of the invention is a latex emulsion paint containing polybutadiene which is characterized by improved freeze stability and washability.

An additional object of the invention is a latex emulsion paint containing the homopolymer of a conjugated diolefin and which forms a stable paint dispersion with pigment systems containing reactive metal oxides.

A further object of the invention is a latex emulsion paint containing polybutadiene and a pigment system containing zinc oxide.

Another object of the invention is a durable, freezestable, washable latex paint comprising polybutadiene latex and a pigment system containing untreated zinc oxide.

Additional objects of this invention will become apparent from the description of the invention as hereinafter set forth.

Generally described, the present invention comprises a stable, washable, freeze-stable water dispersion paint comprising the latex of an emulsion polymer of a conjugated diolefin polymerized in an emulsifier-free system in the presence of from 1 to 20% by weight of diolefin of a water soluble salt of persulfuric acid, and a pigment system comprising a reactive metal oxide. The invention further embraces a process for manufacturing this improved, water dispersion paint by the emulsion polymerization of a conjugated diolefin in the presence of from 1 to 20% of a water soluble salt of persulfuric acid and dispersing therein a pigment composition containing a reactive metal oxide. The preferred reactive metal oxide is zinc oxide. Other reactive metal oxides which may be employed include, without limitation, the oxides of magnesium, lead, cadmium, lithium, strontium, zinc, tin, cobalt and nickel.

Prior art attempts to prepare a satisfactory polybutadiene latex have been logically but nevertheless fallaciously bottomed on the premise that an emulsifier must be initially charged to the system to stabilize the initial and usually critical stages of polymerization. The initial presence of at least a minor amount of an emulsifier is essential in the emulsion polymerization of most, if not all, other monomeric materials to prevent inordinate production of prefloc. It has been found that in the case of the homopolymers of conjugated diolefins and particularly butadiene, the presence of emulsifier not only fails substantially to reduce prefloc, but when employed in accordance with conventional techniques of the art, additionally results in the production of a soft, unstable, and generally unsatisfactory latex. Polymerization of the conjugated diolefins in a system to which no emulsifier is charged not only yields a more stable latex of greatly increased particle size and correspondingly enhanced freeze stability, but, moreover, a latex which produced a harder film.

A satisfactory latex from the combined standpoints of mechanical stability and freeze stability and film toughness can be produced when a conjugated diolefin is polymerized in an emulsifier-free system in the presence of from 1 to 8% of a water soluble salt of persulfuric acid. The hardness of the resultant latex film is found to be directly proportional, and the particle size of the latex inversely proportional, to the concentration of the water soluble salt of persulfuric acid. When less than one part of the catalyst is employed, satisfactory latex stability is not obtained. When more than 8 parts of the catalyst is employed, blushing [1] occurs in the dried films of the latex upon application of water, indicating undesirable water-sensitivity.

It has now been discovered that if from about 5 to about 50 parts by weight of reactive metal oxide is added to the polybutadiene latex produced in an emulsifier-free system or to a water dispersion paint containing such latex, up to about 20 parts of persulfate catalyst may be employed in the system before blushing is again encountered in the dried latex films upon application of water. Use of more than about 20 parts of persulfate also results in an undesirable reduction in latex particle size.

Due to its increased stability, the latex of the invention may be loaded wtih reactive metallic oxides or with a pigment system containing the amount of reactive metal oxide necessary to produce the required washability in the dried paint film. For best results, from about 15 to about 35 parts of zinc oxide per 100 parts by weight of polymer will be employed. While surface treatment of the preferred zinc oxide and other oxides is unnecessary in the stable latex of the invention, a surface coating of zinc phosphate, aluminum oxide, or other suitable material may be employed, if desired.

The polymerization reaction employed to prepare the latex may be carried out either in an acid or alkaline system. However, since it is often inconvenient or undesirable to employ acid resistant equipment, it is preferred that the pH of the polymerization system be adjusted by addition of an alkaline buffering agent to a pH of between about 7 and 12, and preferably between about 8 and 10. Any known alkaline buffering agent, such as borax, potassium or sodium carbonate, trisodium phosphate, etc., may be used to adjust the pH to the desired range.

The reaction is preferably carried out in an aqueous medium wtih water being employed in an amount ranging between 75 and 300 parts to 100 parts monomer. Preferably, between 100 and 150 parts water are employed.

The polymerizable material used in the practice of the invention consists entirely of a monomeric conjugated diolefin. Although the preferred conjugated diolefin is 1,3-butadiene, the invention is equally applicable to other homopolymers of conjugated diolefins having from 4 to 6 carbon atoms, such as 2,3-dimethyl butadiene, 1,3-isoprene, piperylene, and the like.

The polymerization reaction may be effectively carried out within a temperature range of about 20° C. to 150° C., preferably between 60° C. and 90° C.

In addition to the reactive metal oxides, pigments which may be incorporated with the polymeric latex of the invention to produce a water dispersion paint are titanium dioxide, clay, silica, lithopone, mica, barium sulfate, talc, and zinc sulfide. Various dyes and color pigments may also be included in the pigment formulation, including such materials as carbon black, iron oxide, cadmium yellows, phthalocyanines, ultramarine, chromium oxides, umber and sienna. It is preferred to initially form a water dispersion of the pigment and then to carefully admix the latex and the water pigment dispersion. Since most paint pigments are hydrophobic in nature, a pigment dispersing agent will preferably be added. Such dispersing agents are known to the art and include the various water soluble soaps, the aliphatic and aromatic sulfonates, sulfolignins, the aliphatic sulfates, various polyethers and ether-alcohol condensates. Hydrophilic colloidal dispersing agents, such as casein, soya bean protein, and other animal and vegetable proteins may also be employed. Water dispersible cellulosic derivatives such as methyl cellulose are effective pigment dispersing agents in compounding the water dispersion paints of the invention.

Having generally disclosed the invention, more specific illustration will be presented by the following examples. Throughout the examples, as in the remainder of the specification, reference to quantities in terms of "parts" shall be understood to mean parts by weight based on 100 parts weight of monomer.

In the examples, freeze stability determinations were made by the standard process employed in the art. 30 grams of dispersed pigment and 20 grams of aqueous polymer dispersion of about 45% solids content were weighed into ¼ pint metal cans. The metal cans were then covered and placed in a freezing chamber of —10° F. for a period of 16 hours. The cans were then removed from the freezing chamber and the contents allowed to thaw at room temperature. When the contents of the cans had reached room temperature, the contents were observed in order to determine freeze characteristics. If the paint had coagulated, it had failed the freeze test. If, after passing through four such freeze-thaw cycles, the paint remains substantially without grain and sufficiently fluid to pass through a modified Ford cup [2] in not appreciably more than 30 seconds, the paint is considered to possess excellent freeze stability.

---

[1] The milky discoloration of a water-sensitive latex film is known as "blushing." Although the addition of pigment to the latex will normally hide the discoloration, the blush of a latex film nevertheless is translated into the paint film in terms of water-sensitivity.

[2] A conical brass cup having a capacity of 90 millimeters and an orifice in the vertex of the cone of 0.277 inch in diameter. Viscosity values are determined by filling the cup with paint and measuring the time in seconds required for the paint to flow through the cup's orifice.

EXAMPLE 1

100 parts of butadiene were charged to a stainless steel pilot plant reactor containing an aqueous solution of 5 parts potassium persulfate and 3.3 parts borax in 135 parts water. At the end of 24 hours, the reaction had reached 100% conversion. The resulting latex was stabilized with 3.0 parts Triton X-100 [3] plus 2.0 parts of the ammonium salt of linseed oil fatty acid. A water dispersion paint was prepared having the following formula:

| | |
|---|---|
| Rutile $TiO_2$ | 200 |
| Lithopone | 100 |
| Mica | 25 |
| Clay | 75 |
| $Na_4P_2O_7 \cdot 10H_2O$ | 2 |
| Casein solution (13.1%) | 192 |
| Pine oil | 4 |
| $H_2O$ | 112 |
| Latex (45%) | 425 |

After being subjected to four freeze-thaw cycles, the paint exhibited a viscosity of 32, as determined by the use of the modified Ford cup. The dried paint film was hard and continuous.

EXAMPLES 2-7

Examples 2 to 7 in Table I are presented to illustrate the effect of varying the potassium persulfate concentration upon the dispersed latex particle size, the hardness and blushing characteristics of a dried film of the latex, and upon prefloc formation. In these examples, the following recipe was employed:

| | | |
|---|---|---|
| Butadiene | parts | 100 |
| Water | do | 200 |
| Borax | do | 13.3 |
| Potassium persulfate | | As indicated |

The temperature was maintained at approximately 80° C.

Table I

| Example | 2 | 3 | 4 | 5 | 6 | 7 |
|---|---|---|---|---|---|---|
| Potassium persulfate | 20.0 | 15.0 | 10.0 | 5.0 | 3.0 | 1.0 |
| Percent Prefloc | .04 | .05 | .22 | .25 | .21 | .20 |
| Particle Size (A.) | 1,240 | | 1,580 | | | 1,690 |
| Shore "A" Hardness | 86 | 86 | 73 | 73 | 65 | 65 |
| Time to Blush, Sec. | 1 | 1 | 1 | (¹) | (¹) | (¹) |

¹ No evidence of blushing observed.

Examination of the data in Table I will indicate that, in general, decreased prefloc formation and decreased water resistance accompany the use of increasing amounts of persulfate catalyst. When the concentration of persulfate is in excess of about 5 parts by weight of monomer, the formation of latex particles of somewhat reduced size results, and excessive blushing of the dried film of the unmodified latex occurs upon application of water. When a charge of above about five parts of persulfate is employed, it will be noted that a very desirable hardening of the latex particles is obtained which is translated directly into increased durability and toughness of the ultimate paint film. When a persulfate concentration in excess of 20 parts is employed, the particle size of the latex is undesirably reduced, and freeze stability is undesirably lowered.

---

[3] Triton X-100 is an alkylaryl polyether alcohol having the structural formula: $RC_6H_4(OCH_2CH_2)_nOH$, wherein R is an alkyl group having from 6 to 10 carbon atoms and $n$ is an integer from 6 to 30.

EXAMPLES 8-14

A polybutadiene latex was prepared and stabilized in accordance with Example 1. Water dispersion paints were prepared by admixing 100 parts of latex of about 45% solids with 167.1 parts by weight of the pigment dispersions containing from 0 to 15 parts of untreated and phosphated zinc oxide. The compositions of the paints formulated were as follows:

Table II

| Example | 8 | 9 | 10 | 11 | 12 | 13 | 14 |
|---|---|---|---|---|---|---|---|
| Latex (parts) | 100 | 100 | 100 | 100 | 100 | 100 | 100 |
| Pigment: | | | | | | | |
| ZnO ¹ | 0 | 5 | 10 | 15 | | | |
| ZnO (phosphated) | | | | | 5 | 10 | 15 |

¹ (Parts by weight of pigment solids):

| | |
|---|---|
| Rutile $TiO_2$ | 47.0 |
| Lithopone | 23.5 |
| Mica | 5.9 |
| Clay | 17.7 |
| $Na_4P_2O_7 \cdot 10H_2O$ | .47 |
| Casein solution (13.1%) | 45.2 |
| Pine oil | .94 |
| $H_2O$ | 26.4 |

None of the paints exhibited substantial viscosity change after storage at 55° C. for 17 days. The paints were then applied to ground glass test surfaces. All dried films were tough and continuous. After 17 days, the films were tested for washability as measured by a Gardner Straight Line Washability and Abrasion Machine. The film containing no zinc oxide (Example 8) failed at 164 strokes. The test was discontinued after 2,000 strokes. None of the films containing either untreated or phosphated zinc oxide failed.

From the foregoing examples, it will be observed that hard, freeze-stable latex may be obtained by polymerizing a conjugated diolefin, particularly 1,3-butadiene, in an emulsifier-free system in the presence of from 1 to 20 parts of persulfate catalyst. Examples 9 through 14 establish that a durable, highly washable water dispersion paint may be prepared from this latex by admixture therewith of a reactive metal oxide or a pigment system containing a reactive metal oxide. The paints so produced are stable and exhibit no substantial viscosity change during storage.

Since various modifications of the invention as disclosed will occur to those skilled in the art, it is intended that the present invention be limited only by the scope of the appended claims.

Having thus described the invention, what is claimed is:

1. A process of preparing a stable water dispersion paint of increased freeze-stability and increased wash resistance which comprises (1) homopolymerizing 100 parts by weight of water-insoluble 1,3-butadiene in an emulsifier-free system at a temperature between about 20° C. and 150° C. in the presence of between 75 and 300 parts by weight of water and from 1 to 20 parts by weight of a water-soluble salt of persulfuric acid to produce a latex, and (2) admixing said latex with an alkylaryl polyether alcohol having the structural formula $$RC_6H_4(OCH_2CH_2)_nOH$$

wherein R is an alkyl group having from 6 to 10 carbon atoms and $n$ is an integer from 6 to 30, the ammonium salt of linseed oil fatty acid and a paint pigment system containing from 15 to 35 parts by weight of zinc oxide per 100 parts by weight of 1,3-butadiene homopolymer present to produce a paint.

2. A process according to claim 1 in which the water-soluble salt is potassium persulfate.

3. A process according to claim 1 in which the polymerization reaction is carried out in the presence of sufficient alkaline buffering agent to maintain a pH of between 7 and 12.

4. A water dispersion paint produced by the process of claim 1.

(References on following page)

References Cited in the file of this patent

UNITED STATES PATENTS

| | | |
|---|---|---|
| 2,383,055 | Fryling | Aug. 21, 1945 |
| 2,676,930 | McKay et al. | Apr. 27, 1954 |
| 2,727,012 | Treat et al. | Dec. 13, 1955 |
| 2,847,404 | Hoertz | Aug. 12, 1958 |
| 2,886,546 | Dilbert et al. | May 12, 1959 |
| 2,887,460 | Dilbert et al. | May 19, 1959 |

OTHER REFERENCES

Willis, "Industrial and Engineering Chemistry," vol. 41, No. 10, pages 2272–2276, October 1949.

Matiello, "Protective and Decorative Coatings," vol. 11, pages 369–371, John Wiley and Sons, Inc., New York City (1942).

Drubel, "Official Digest," pages 643–644, September 1953.